(12) United States Patent
Ascherl et al.

(10) Patent No.: US 12,140,964 B2
(45) Date of Patent: Nov. 12, 2024

(54) SYSTEM AND METHOD FOR AUTONOMOUS WORK MACHINE EXCEPTION HANDLING

(71) Applicant: Deere & Company, Moline, IL (US)

(72) Inventors: Margaux M Ascherl, Adel, IA (US); Jeffrey E. Runde, Cedar Falls, IA (US); Curtis A. Maeder, Johnston, IA (US); David. A. Johnson, Durham, NC (US)

(73) Assignee: Deere & Company, Moline, IL (US)

( * ) Notice: Subject to any disclaimer, the term of this patent is extended or adjusted under 35 U.S.C. 154(b) by 431 days.

(21) Appl. No.: 17/179,893

(22) Filed: Feb. 19, 2021

(65) Prior Publication Data

US 2022/0269282 A1 Aug. 25, 2022

(51) Int. Cl.
*G05D 1/00* (2024.01)
*B60W 30/09* (2012.01)
(Continued)

(52) U.S. Cl.
CPC ........... *G05D 1/0253* (2013.01); *B60W 30/09* (2013.01); *B60W 60/0015* (2020.02); *G05D 1/0011* (2013.01); *G05D 1/0088* (2013.01); *G07C 5/0808* (2013.01); *B60W 50/14* (2013.01); *B60W 2420/403* (2013.01); *B60W 2554/00* (2020.02);
(Continued)

(58) Field of Classification Search
CPC .. G05D 1/0253; G05D 1/0011; G05D 1/0088; G05D 1/0242; G05D 2201/0201; G05D 2201/0202; B60W 60/0015; B60W 30/09; B60W 2554/00; B60W 2556/45; B60W 50/14; B60W 2420/42; G07C 5/0808
See application file for complete search history.

(56) References Cited

U.S. PATENT DOCUMENTS 10,564,638 B1 *  2/2020  Lockwood ............... G05D 1/00
10,657,823 B2   5/2020  Lesher et al.
(Continued)

OTHER PUBLICATIONS

European Search Report issued in European Patent Application No. 22154045.3, dated Nov. 4, 2022, 16 pages.
(Continued)

*Primary Examiner* — Anne Marie Antonucci
*Assistant Examiner* — Jingli Wang
(74) *Attorney, Agent, or Firm* — Christopher R. Christenson; Kelly, Holt & Christenson PLLC (57) ABSTRACT

A control system for an autonomous work machine includes a robotic controller, a position detection system coupled to the robotic controller, and a sensor coupled to the robotic controller and configured to provide a sensor signal. A controlled system is coupled to the robotic controller to receive control signals from the robotic controller. The robotic controller is configured to generate an event relative to an object in an environment around the autonomous work machine or a machine health/job quality issue, document the event, and store the documented event. The robotic controller is further configured to selectively generate a communication containing at least some information relative to the documented event to a supervisor and to receive user input from the supervisor and take responsive action based on the user input.

16 Claims, 6 Drawing Sheets

(51) Int. Cl.
*B60W 50/14* (2020.01)
*B60W 60/00* (2020.01)
*G07C 5/08* (2006.01)

(52) U.S. Cl.
CPC ....... *B60W 2556/45* (2020.02); *G05D 1/0242* (2013.01)

(56) References Cited

U.S. PATENT DOCUMENTS

| | | |
|---|---|---|
| 10,773,665 B2 | 9/2020 | Foster et al. |
| 2017/0123428 A1 | 5/2017 | Levinson et al. |
| 2018/0136644 A1 | 5/2018 | Levinson et al. |
| 2018/0316895 A1* | 11/2018 | McClelland ............. G07C 5/02 |
| 2018/0319392 A1* | 11/2018 | Posselius .............. G01S 13/931 |
| 2019/0130759 A1 | 5/2019 | Lesher et al. |
| 2019/0176639 A1 | 6/2019 | Kumar et al. |
| 2019/0310627 A1 | 10/2019 | Halder |
| 2019/0376800 A1* | 12/2019 | Pedersen .............. G05D 1/0011 |
| 2020/0114843 A1 | 6/2020 | Foster et al. |
| 2020/0183394 A1* | 6/2020 | Lockwood ............. G07C 5/008 |
| 2020/0202705 A1 | 6/2020 | Sakai et al. |
| 2020/0209848 A1 | 7/2020 | Mercep et al. |
| 2021/0192867 A1* | 6/2021 | Fang ................... G07C 5/0816 |
| 2021/0263152 A1* | 8/2021 | Halder ................. G05D 1/0088 |

OTHER PUBLICATIONS

Extended European Search Report and Written Opinion issued in European Patent Application No. 22154045.3, dated Jun. 28, 2022, in 14 pages.

* cited by examiner

SYSTEM AND METHOD FOR AUTONOMOUS WORK MACHINE EXCEPTION HANDLING

FIELD OF THE DESCRIPTION

This description generally relates to autonomous work machines. More specifically, but not by limitation, the present description relates to a system and method for providing exception handling in an autonomous work machine.

BACKGROUND

Unmanned Ground Vehicles (UGVs) are mobile machines that can move and perform work without having a human operator onboard. Some UGVs may operate autonomously thereby following a path and performing work in accordance with one or more job parameters.

Unmanned Ground Vehicles offer many advantages over manned systems for a variety of industries. First, they may operate more safely and precisely. Second, their sensing abilities are not limited to human senses. Third, they are not subject to human limitations, such as needing to sleep or eat, fatigue, human error, et cetera.

As UGVs begin to find use in such industries as agriculture, forestry, and construction, it is important that they interact with operators and the environment around them in a manner that is safe and efficient. Unlike hobby drones or residential lawn mowers, these massive machines have the ability to cause significant loss or damage if their activities are misplaced or performed erroneously. Further, industry adoption of such UGVs requires enough trust in the platform and system to incur the expense of equipment acquisition and then further trust to operate the UGVs on their jobs. Finally, given the significant increase in complexity over manned systems, it is important for UGVs to provide interfaces and workflows that are easy and intuitive for operators.

Precision agriculture and smart farming offer potential solutions to meet the rising food needs of an ever-expanding human population. One aspect of smart farming uses unmanned ground vehicles to perform field operations. Such UGVs can or will soon perform tasks related to fertilizing before seeding, seeding, spraying crops, and harvesting.

The discussion above is merely provided for general background information and is not intended to be used as an aid in determining the scope of the claimed subject matter.

SUMMARY

In one aspect, a computer-implemented method of handling object detection in an autonomous work machine is provided. The method includes detecting an object while performing a mission with the autonomous work machine and determining, with a robotic controller of the autonomous work machine, whether the object requires the work machine to take action to avoid the object. The method includes selectively obtaining information relative to object detection and storing the information, based on the determination of whether the object requires the autonomous work machine to take action to avoid the object. The method further includes determining, with the robotic controller of the autonomous work machine, whether the obstacle is in a category and in a location that requires the autonomous work machine to stop. Based the determination of whether the work machine is required to stop, motion of the work machine is selectively halted. A communication is generated to a supervisor indicating that motion has been halted and requesting user input. Based on the user input, the method includes selectively continuing the mission or shutting down the autonomous work machine.

In another aspect, a computer-implemented method of handling a machine health/job quality issue in an autonomous work machine is provided. The method includes detecting a machine health/job quality issue while performing a mission with the autonomous work machine and determining, with a robotic controller of the autonomous work machine, whether the detected machine health/job quality issue has an exception routine for the detected machine health/job quality issue. The method includes performing the exception routine for the detected machine health/job quality issue and determining whether the exception routine resolved the machine health/job quality issue. Based on whether the determination of whether exception routine resolved the machine health/job quality issue, the method includes selectively generating a communication to a supervisor, wherein the communication requests a supervisor decision. The method includes receiving user input indicative of a supervisor decision and taking responsive action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
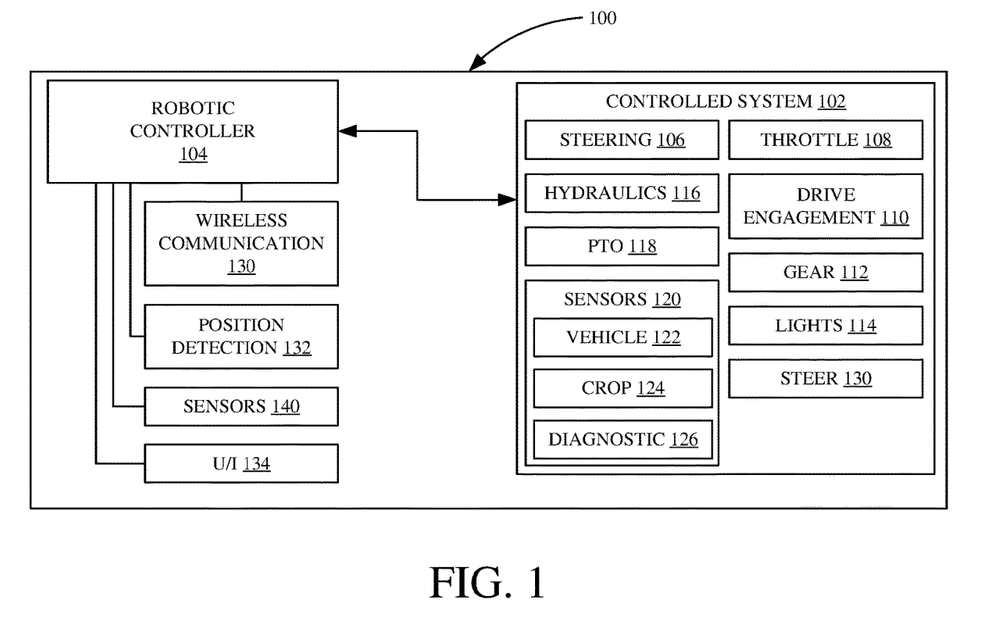
FIG. 1 is a block diagram of a control system of an UGV with which embodiments described herein are particularly useful.

FIG. 1 is a block diagram of a control system of an UGV with which embodiments described herein are particularly useful. Control system 100 includes controlled vehicle system 102 coupled to or including robotic controller 104. Robotic controller 104 receives or generates one or more ground operations for the unmanned ground vehicle and provides control signals to controlled system 102 to operate the vehicle.

Controlled system 102 includes a number of subsystems that operate various functions of the vehicle. Steering subsystem 106 provides directional control for the vehicle. In examples where there is no provision for a human driver, the steering subsystem 106 may directly control hydraulic or mechanical elements to cause movement elements (e.g. wheels or tracks) to follow a particular course. In another example, when the ground vehicle is equipped with provision for a human operator, steering subsystem 106 may include the human operable steering mechanism as well as electromechanical system for engaging the human operably steering system.

Controlled system 102 also includes throttle subsystem 108 for controlling the speed or power of the prime mover of the system. In examples where the vehicle uses an internal combustion engine, throttle subsystem 108 may control the amount of air provided to the internal combustion engine. In examples where the vehicle uses an electric drive, throttle subsystem may provide a control signal that specifies an amount of power to be applied to the electric drive motor(s).

Controlled system 102 also includes drive engagement system 110. Drive engagement system 110 selectively couples the prime mover to the movement elements. As such, drive engagement system 110 may include a clutch and/or hydraulic circuit. Transmission control subsystem 112 is also provided and selects different dears or drive ranges. In examples where UGV is a semi-tractor, transmission control subsystem 112 may select among up to 18 gears.

Controlled system 102 may also include a light subsystem 114 that may provide lights for illumination and/or annunciation. Such lights may include front illumination lights, rear illumination lights as well as side illumination lights. The illumination lights may provide illumination in the visible spectrum and/or in a spectrum that is detectable by sensors 140 coupled to robotic controller 104.

Controlled system 102 also may include hydraulics system 116 that has a hydraulic pump operably coupled to the prime mover as well as one or more hydraulic valves that control hydraulic fluid flow to one or more actuators of the vehicle. Hydraulics system 116 may be used to lift or position objects, such as a bucket or work implement.

Controlled system 112 may also include or be coupled to power take-off (PTO) subsystem 118. PTO subsystem 118 controls engagement between the prime mover and a PTO output shaft or coupling, which is used by towed implements for power.

Controlled system 112 also includes a number of sensors 120 germane to the operation of the controlled system. Where controlled system 112 includes an internal combustion engine, sensors 120 may include an oil pressure sensor, an oil temperature sensor, an RPM sensor, a coolant temperature sensor, one or more exhaust oxygen sensors, a turbine speed sensor, et cetera. In examples where the controlled system includes a hydraulic system, sensors 120 can include a hydraulic pressure sensor. In examples where the controlled system is an agricultural harvester, sensors 120 can include such sensors as a moisture sensor, mass flow sensor, protein content sensor, et cetera.

Controlled system 112 may include one or more additional subsystems as indicated at reference numeral 130.

Robotic controller 104 is coupled to controlled system 102 as indicated at reference numeral 129. This connection may include one or more system busses out connections such that robotic controller can issue command signals to the various subsystems of controlled system 102. Robotic controller 104 may include one or more processors or logic modules that enable robotic controller 104 to execute a sequence of instructions stored within memory (either within robotic controller 104 or coupled thereto) to enable robotic controller 104 to perform automatic or semi-automatic control functions. In one embodiment, robotic controller 104 is a microprocessor.

Robotic controller 104 is coupled to wireless communication module 130 to allow control system 100 to communicate wirelessly within one or more remote devices. Wireless communication can take various forms, as desired. Examples of suitable wireless communication include, without limitation, Bluetooth (such as Bluetooth Specification 2.1 rated at Power Class 2); a Wi-Fi specification (such as IEEE 802.11.a/b/g/n); a known RFID specification; cellular communication techniques (such as GPRS/GSM/CDMA/5G NR); WiMAX (IEEE 802.16), and/or satellite communication.

Robotic controller 104 is also coupled to position detection system 132, which allows robotic controller 132 to determine the geographical location of control system 100. In one example, position detection system 132 includes a GPS receiver that is configured to receive information from GNSS satellites and calculate the device's geographical position.

Robotic controller 104 is also coupled to one or more sensors 140 that provide respective signals that allow robotic controller to move the machine to perform a given task. Examples of sensors 140 include camera systems that view the area around the machine. These cameras may operate in the visible spectrum and/or above and/or below it. Sensors 140 may also include one or more LIDAR sensors that provide a direct indication of distance from the machine to an object in the environment. Sensors 140 can also include other types of sensors that provide information indicative of a distance to objects around the machine, such as RADAR and/or ultrasonic sensors. Certainly, combinations of the various sensors set forth above can also be used. Sensors 140 may also include audio sensors such that robotic controller can detect sounds (such as nominal operation of the machine, abnormal conditions, and/or human voice).

Robotic controller is also coupled to user interface module 134, which may be coupled to one or more displays in a cab of the machine as well as one or more user input mechanisms, such as buttons, pedals, joysticks, knobs, et cetera. Additionally, or alternatively, user interface module 134 may be configured to generate a user interface on a remote user device, such as a laptop computer, smartphone, or tablet. In such instance, user interface module 134 may provide user interface information in any suitable format including HTML.

As set forth above, the safe operation of autonomous work machines is very important. With such systems being designed for such high safety, it may be relatively common to have false positives occur during autonomous vehicle operation. In order to mitigate the annoyance of repeatedly dealing with false positives, it is thus very important to provide effective exception handling procedures for autonomous work vehicle operation. The systems and methods described herein facilitate very high safety via robust issue detection yet provide effective exception handling to minimize or at least mitigate the effects on users.

Figure 2:
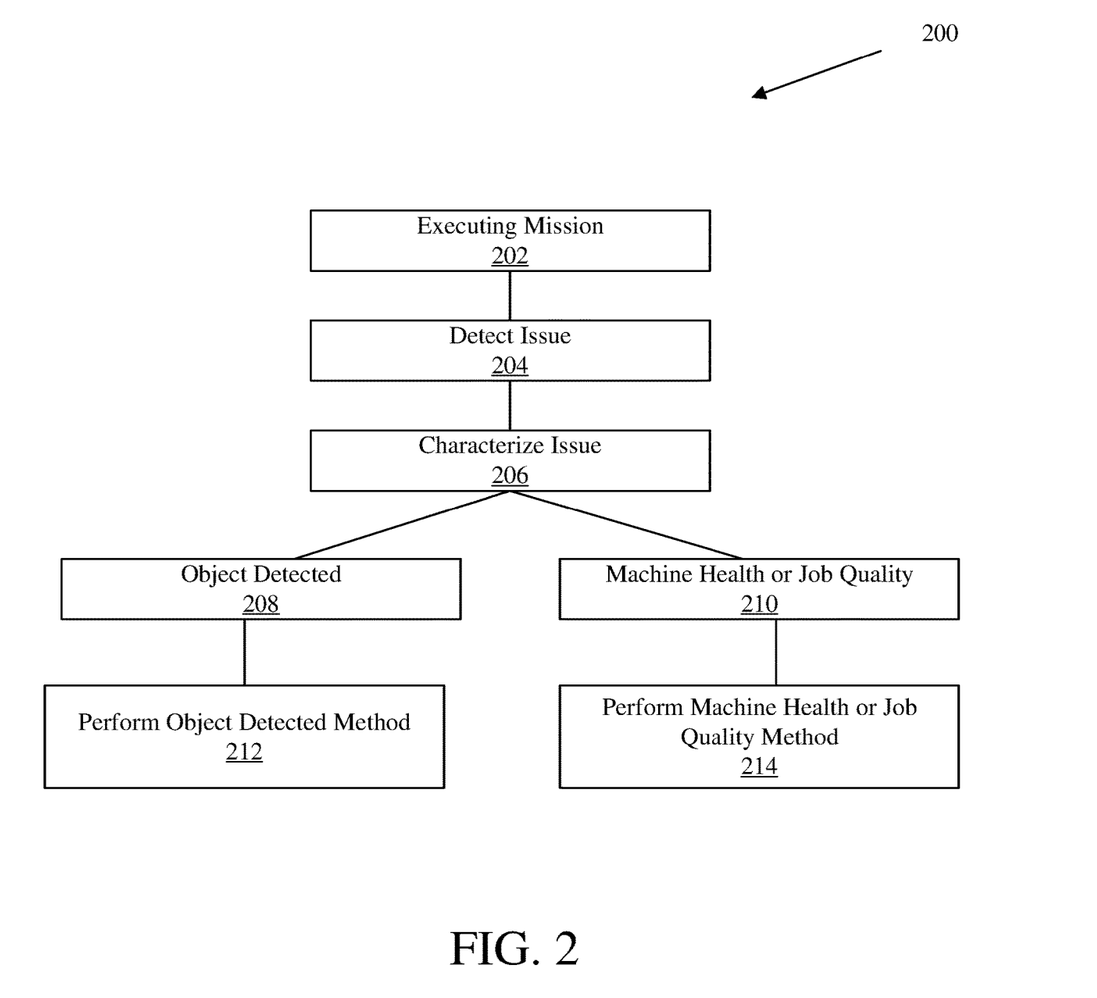
FIG. 2 is a diagrammatic method of autonomous vehicle operation in accordance with one embodiment.

FIG. 2 is a diagrammatic method of autonomous vehicle operation in accordance with one embodiment. Method 200 begins at block 202 where the autonomous vehicle is performing a mission autonomously. For example, this autonomous mission may be related to agriculture, such as applying nutrients to a crop or harvesting a crop. In another example, the autonomous vehicle may be transporting cut logs in an autonomous forestry operation. Next, at block 204, the autonomous work machine detects an issue. Issue detection is performed by robotic controller 104 monitoring or otherwise analyzing any of the various signals from sensors 140 or from position detection system 154. Further issue detection may be performed by robotic controller 104 via signals from the controlled system 102. Examples of such issues may be one or more cameras of the autonomous work machine detecting an object in the path of the work machine; an oil pressure signal from the controlled system indicating a loss of oil pressure; a crop sensor on a harvester indicating blockage within the harvester. Regardless, there is a wide variety of issues that may arise during autonomous operation.

At block 206, the detected issue is characterized by robotic controller 104. This characterization may be inherent in the source of the signal giving rise to the issue. For example, if an oil pressure sensor detected a loss of oil pressure in an internal combustion engine, then the issue is characterized as machine health. In other examples, robotic controller 104 may employ other sensors or combinations of sensor signals to characterize the issue. In the example shown in FIG. 2, the issue is characterized as either an object detection 208 or a machine health/job quality issue 210. If an object is detected, control passes to block 212 where an object detection handling method is performed by robotic controller 104. If a machine health and/or job quality issue is detected, robotic controller performs the machine health/job quality method as indicated at block 214.

Figure 3:
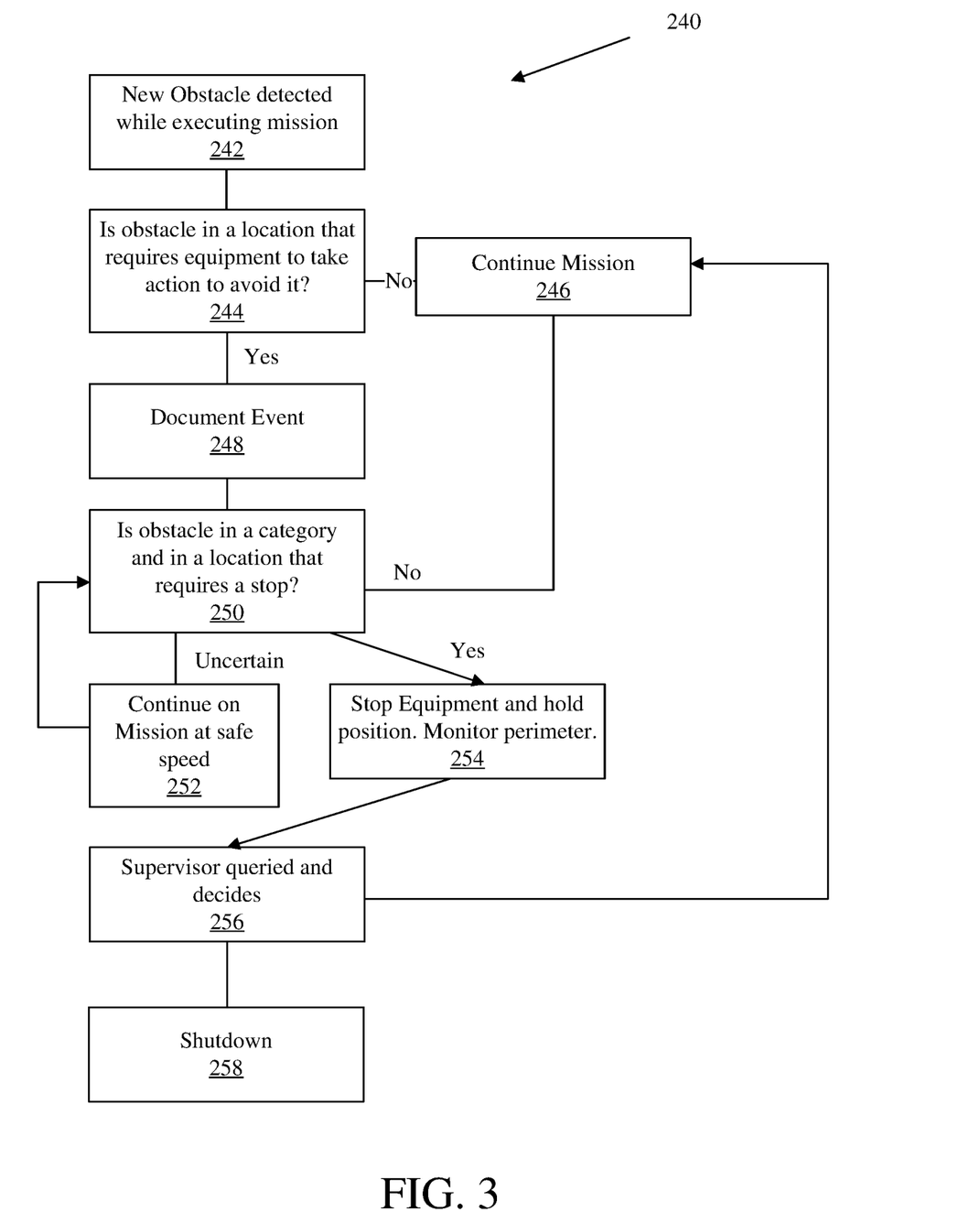
FIG. 3 is a flow diagram of a method of handling object detection in an autonomous work machine in accordance with one embodiment.

FIG. 3 is a flow diagram of a method of handling object detection in an autonomous work machine in accordance with one embodiment. Method 240 begins at block 242 where an object is detected by robotic controller 104, or in any suitable manner. Object detection may be based on signals from one or more cameras, LIDAR sensors, radar sensors, and/or ultrasonic sensors as well as any combination thereof. Obstacle detection includes detecting any object in the environment around the autonomous work machine. Such object detection and avoidance is important in order to protect people, property, and/or job quality.

At block 244, robotic controller 104 determines whether the detected object requires the autonomous work machine to take action to avoid the object. Thus, robotic controller, using one or more cameras or sensors, determines the position of the detected object relative to the current path of the work machine. The width of the path is also considered as an implement can easily be much wider than the tractor pulling it. If the detected object is determined, by robotic controller 104, to not be within the current path of the work machine, then control passes to block 246 where the mission continues. However, if robotic controller 104 determines that the autonomous work machine needs to take action to avoid the detected obstacle, then control passes to block 248.

At block 248, robotic controller 104 documents the event. Documenting the obstacle detection event includes obtaining information about the obstacle and its position. Preferably, the time of obstacle detection is also obtained. This information is then stored or otherwise persisted in a storage device of the autonomous work machine and/or communicated to a remote data store. Information about the obstacle can include a still image of the object, a sequence of images, or a short video of the object. The images may all be taken with one or more cameras that employ the visible spectrum. However, images can also be used from cameras that detect non-visible illumination, such as infrared. A characterization of the object can also be provided using image analytics on the image(s) to provide an estimate of the object (e.g. tumbleweed, animal, rock, et cetera). The position of the object, either in absolute geographic terms (e.g. latitude and longitude) or relative to the autonomous work machine (e.g. 20 yards in front) is also stored. Additionally, any noteworthy system states or context information can also be stored. For example, the current speed and operational status of a towed implement, could provide such context information. Finally, the information is stored (locally in the autonomous machine, remotely, or both) along with a flag indicating object detection.

Once the object detection event has been documented, control passes to block 250 where robotic controller 104 determines whether the detected obstacle is in a category and in a location that requires a stop. As shown in block 250, the determination has three potential outputs depending on a confidence level determined by robotic controller 104. If the determination is that a stop is not required, and the determined confidence level is above a certain threshold (e.g. 90%), then control passes to block 246 and the autonomous work machine continues executing the mission autonomously.

If robotic controller 104 determines that a stop is not required or that a stop is required, but the confidence level is below the threshold, then control passes to block 252. At block 252, robotic controller applies control parameters to controlled system 102 to adjust system operation for uncertain operation. Examples of such adjustments include reducing the speed of the autonomous work machine, increasing illumination, et cetera. With the proper parameter(s) applied for uncertain operation, method 240 reverts to block 250 where it is once again determined whether the detected object is in a category and in a location that requires a stop. However, the autonomous work machine is now closer to the object and may have better abilities to characterize it. This uncertain operation continues until the confidence threshold is exceeded for either continuing the mission or stopping the equipment.

If it is determined by robotic controller 104, at block 252, that the autonomous work machine must be stopped, the robotic controller 104 commands the controlled system to stop moving, as indicated at block 254. This may be done by commanding drive engagement subsystem 110 to disengage, or any other suitable manner. Next, robotic controller 104 causes the controlled system to hold its position (i.e. not move) and to monitor its perimeter using sensors 140. Preferably, such monitoring uses images processing of camera images from one or more cameras mounted to the autonomous work machine. Thus, at block 254, robotic controller 104 has determined that the object is in the way and it has also determined that the object should not be run over. At this point, autonomous operation has ceased, and further information is required before the mission may continue.

Once the autonomous work machine has stopped and is monitoring its perimeter, control passes to block 256 to enlist human assistance. At block 256, robotic controller 104 uses wireless communication module to generate a notification of the detected event to a human supervisor 130. The human supervisor may be selected by robotic controller depending on characteristics of the detected object. For example, if the detected object is a tumbleweed, the human supervisor may be selected to be an operations center of the manufacturer of the autonomous work system. In such instance, robotic controller may provide the information stored when the event was documented at block 248. This would allow a supervisor located at the operations center to view the object and other relevant information and provide a decision to either shut the autonomous work machine down, as indicated at reference numeral 258 or to continue executing the mission 246. When the operations center decision is received, that decision is also stored or otherwise persisted in local autonomous machine storage and/or a remote data store. In this way, some of the human-required assistance can be provided by a remote operations center/team.

At block 256, robotic controller 104 may send the object detected assistance request to the owner/supervisor of the field operation. This may be as a result of robotic controller 104 determining that the nature of the detected object requires the owner/supervisor assistance. In other examples, robotic controller 104 may simply direct all object detected assistance requests to the owner/supervisor. This notification preferably includes the image(s) stored when the event was documented along with other relevant information such as a characterization of the image, the position of the detected object and the time of detection. This notification can be provided in any suitable form, such as an email, an SMS message, an invitation to log into robotic controller 104, or the passing of selected data to an application that executes on a mobile device (e.g. tablet, laptop, smartphone, et cetera) of the owner/supervisor. The owner/supervisor then decides whether the mission may continue, in which case control returns to block 246, or whether the autonomous machine should shut down, in which case control passes to block 258. In some examples, the decision may also include a command to generate a path deviation in order to avoid the detected object. In such cases, once the path has been adjusted, and preferably with the express approval of the supervisor/owner, the autonomous work machine will move around the detected object and then continue the mission by reverting to block 246.

Figure 4:
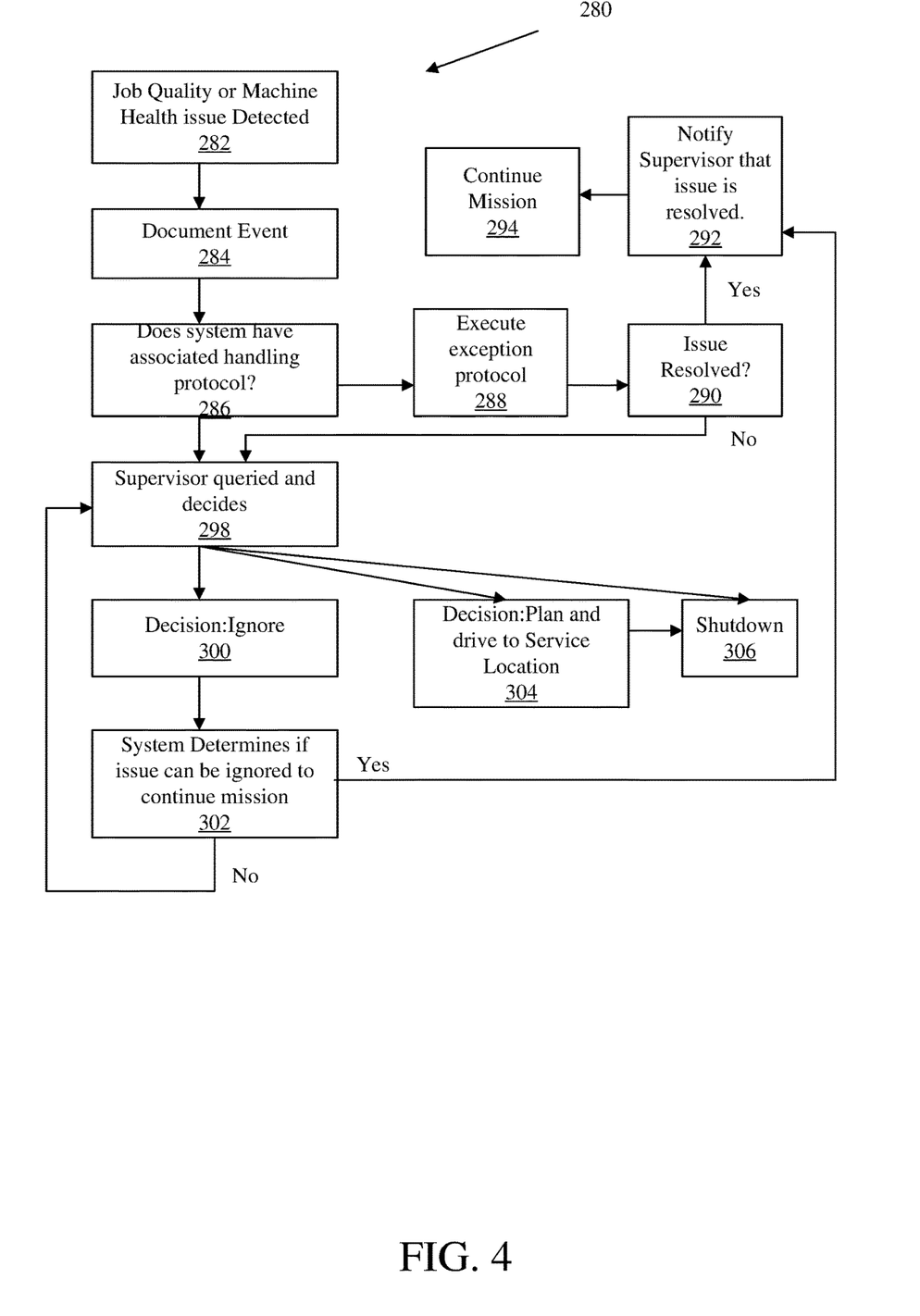
FIG. 4 is a flow diagram of a method of addressing a machine health or job quality issue of an autonomous work machine in accordance with one embodiment.

Returning to FIG. 2, if the detected issue is characterized as one of machine health or job quality, then a machine health/job quality method is performed. FIG. 4 is a flow diagram of a method of addressing a machine health or job quality issue of an autonomous work machine in accordance with one embodiment. Method 280 begins at block 282 with the machine health or job quality issue detection. Machine health issues may be detected in the form of a trouble code or fault being generated by any of the controllers or subsystem of the controlled system or of the robotic controller 104. Preferably, the list of codes is expandable to include other diagnostic trouble codes or faults that may be programmed or uploaded after the manufacture of the autonomous work machine. Thus, if the manufacturer becomes aware of a type of machine health issue that is characterized by one or more sensor signals having a particular trend (e.g. oxygen sensor indicating rich condition coupled with coolant at an elevated, but not abnormal, temperature) such issue/sensor correlation can be uploaded or otherwise updated in robotic controller 104 to allow controller 104 to detect the new issue. Accordingly, it is preferred that the list of issues be expandable. The list may be stored in memory of the autonomous work machine and/or stored remotely in a cloud-based data store. In such case, the remotely-stored list can be easily updated as new issues are studied and handling protocols are developed.

Next, at block 284, robotic controller documents the job quality or machine health event. This is similar to the documentation of object detection described with respect to block 244 in FIG. 3. However, machine health and job quality may have more complex root causes and thus the context regarding relevant subsystem and when/where the event occurred may be more relevant. However, machine health/job quality event documentation can still include one or more still images and the geographic position of the autonomous vehicle. Such information may be useful to resolving the issue in cases where the autonomous vehicle has become stuck or where something has become intertwined within the workings of the machine. The event information may be stored locally in the autonomous work machine and/or stored in a remote data store using wireless communication module 130.

At block 286, robotic controller 104 determines whether the system has an associated handling protocol for the detected machine health/job quality event. If the event has an associated handling protocol, then control passes to block 288 where robotic controller 104 executes the associated handling protocol. One example of an associated handling protocol may be immediate shutdown without querying a supervisor for any decision. Such action may be selected for machine health events that require immediate attention. For example, a loss of oil pressure in an engine can quickly destroy the engine if operation continues. Similarly, overheating issues can damage or destroy equipment very quickly.

Once the protocol has been executed, control passes to block 290, where robotic controller 104 determines whether the issue has been resolved. Determination of issue resolution may be performed using the same sensor signals that gave rise to the issue detection. For example, it may be determined that such sensor signals have returned to their pre-event values. Additionally, or alternatively, issue resolution may employ additional sensors, such as directing a camera (either visible spectrum or infrared) to view an area on the autonomous work machine that gave rise to the issue. If robotic controller 104 determines that the issue has been resolved, then control passes to block 292 where a notification of issue resolution is sent to the supervisor. After the notification has been sent, control passes to block 294 where the robotic controller continues executing the mission.

As shown in FIG. 4, if robotic controller 104 determines that a handling protocol does not exist for the detected machine health/job quality issue, then control passes to block 298. Block 298 also executes when a suitable handling protocol does exist, but after execution, does not resolve the issue. At block 298, robotic controller 104 generates a communication to a human supervisor regarding the detected issue. As set forth above, robotic controller 104 may select the human supervisor based on the issue. In examples where block 298 executes after an exception protocol has been executed, but has failed to resolve the issue, the exception protocol may provide guidance regarding which entity to contact. For example, if the issue is directed to an internal combustion engine of the autonomous work machine, an operator within a remote operations support center may be contacted, where the selected operator has particular expertise for the detected issue. In another example, if the issue has to do with job quality for a particular implement (e.g. sprayer, seeder, et cetera), then an operator may be selected that has expertise with that particular implement. In other examples, robotic controller 104 may simply be programmed or set to direct all requests to an owner/supervisor. Regardless, robotic controller 104 communicates the stored document event information to the human supervisor and then awaits a decision.

If the supervisor chooses to shut the autonomous work machine down immediately, control passes to block 306, where robotic controller 104 executes an immediate shutdown of the autonomous work machine.

Alternately, if the supervisor chooses to ignore the issue, control passes to block 300. For example, block 300 may execute where the detected issue is a job quality issue and the supervisor just wants to continue the job regardless of the quality issue. After block 300, control passes to block 302 where robotic controller determines whether the issue can be ignored to continue the mission. If so, control passes to block 292 where the supervisor is notified of issue resolution, after which control passes to block 294 where the autonomous work machine continues executing the mission. However, if robotic controller 104 determines, at block 302, that the issue cannot be ignored, control returns to block 298 with a notification indicating that the issue cannot be ignored.

At block 298, if the supervisor has decided that the mission should be halted, but that immediate shutdown is unnecessary, the supervisor may decide that the autonomous work machine should plan and drive to a service location in the field, as indicated at block 304, and once there, should execute its shutdown procedure as indicated at block 306. The service location may be a location where the autonomous work machine first began executing the mission or may be any other suitable location. Thus, the autonomous work machine will stop performing its mission and go to a place (such as an end of a field) where it can be checked, serviced, or transported.

The present discussion has mentioned processors and servers. In one embodiment, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 5:
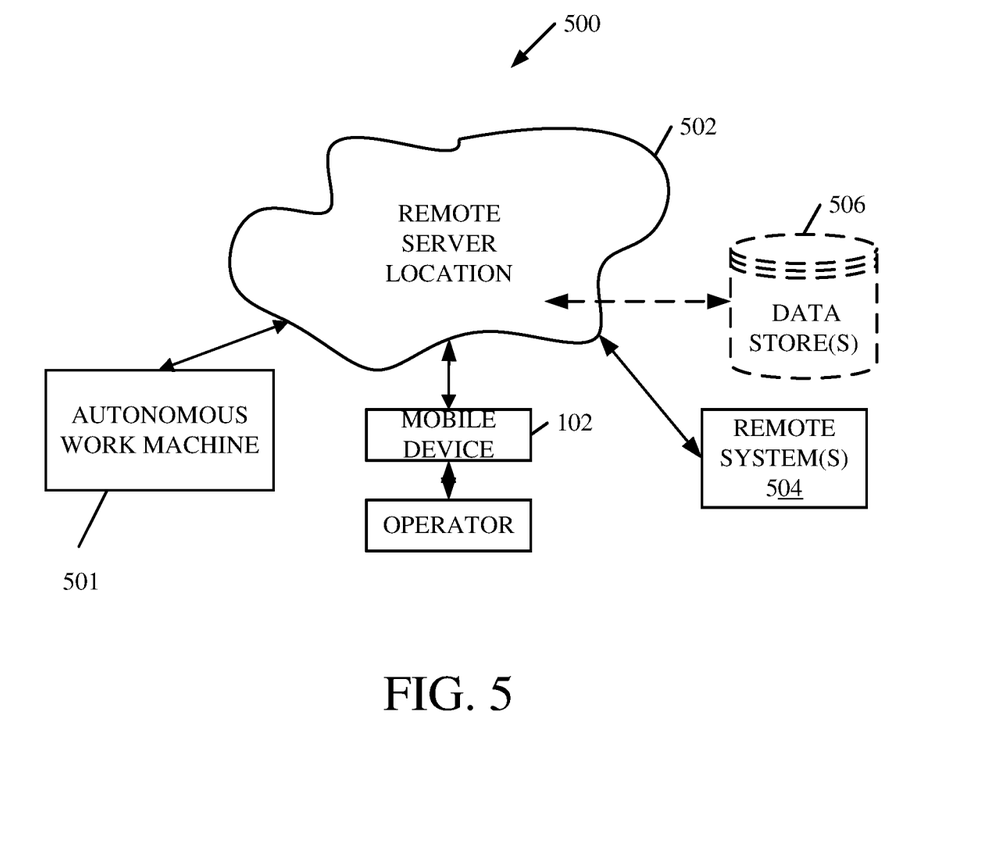
FIG. 5 is a block diagram of an autonomous work machine communicating with elements in a remote server architecture.

FIG. 5 is a block diagram of an autonomous work machine 501 communicating with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

FIG. 5 also depicts another embodiment of a remote server architecture. FIG. 5 shows that it is also contemplated that some elements of FIG. 1 are disposed at remote server location 502 while others are not. By way of example, remote storage (e.g. data store 506) can be disposed at a location separate from location 502 and accessed through the remote server at location 502. Regardless of where they are located, they can be accessed directly by the autonomous work machine, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
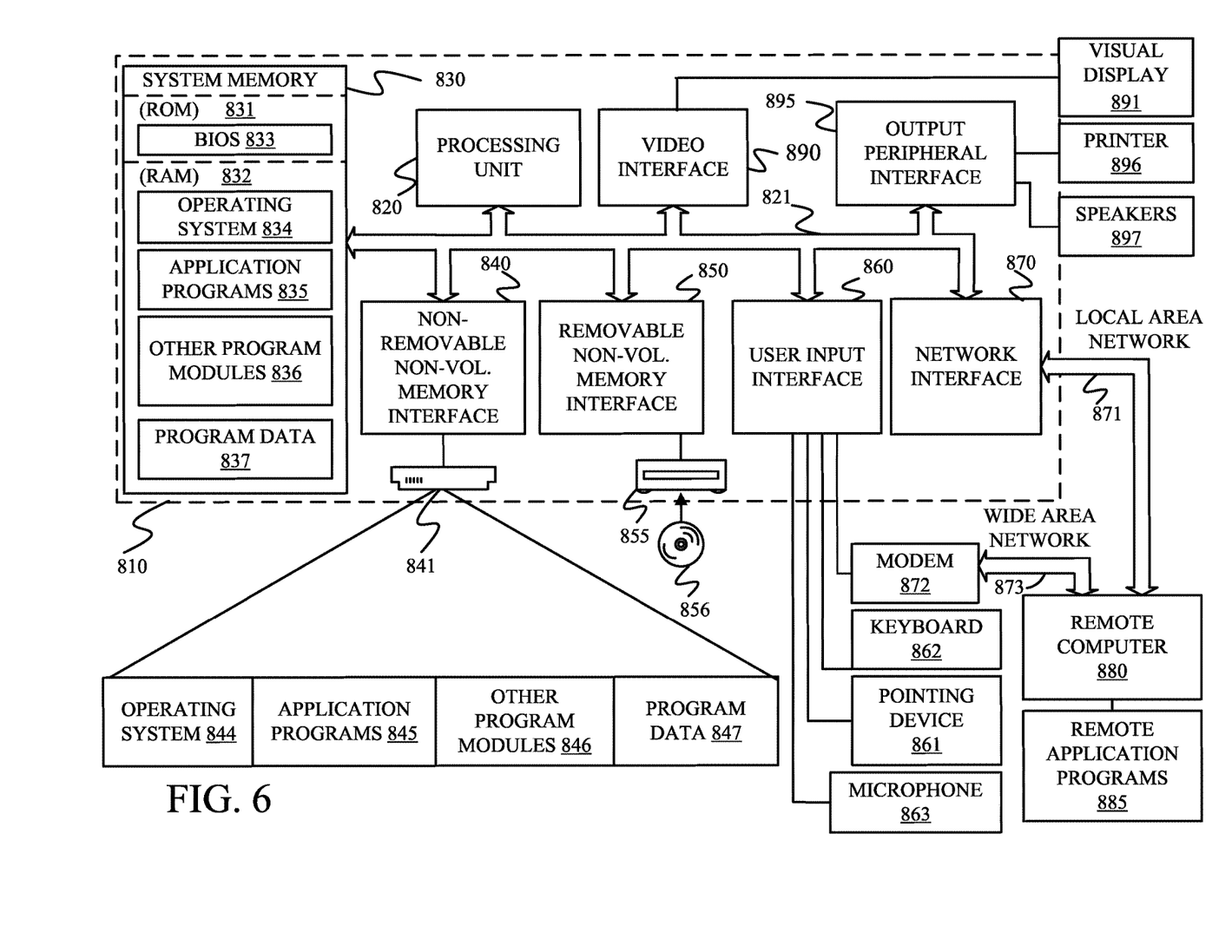
FIG. 6 is a diagrammatic view of one example of a computing environment in which elements of FIG. 1, or parts of it, (for example) can be deployed.

FIG. 6 is one embodiment of a computing environment in which elements of FIG. 1, or parts of it, (for example) can be deployed. With reference to FIG. 6, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 19.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, a magnetic disk drive 851, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a computer-implemented method of handling object detection in an autonomous work machine. The method includes detecting an object while performing a mission with the autonomous work machine and determining, with a robotic controller of the autonomous work machine, whether the object requires the work machine to take action to avoid the object. The method includes selectively obtaining information relative to object detection and storing the information, based on the determination of whether the object requires the autonomous work machine to take action to avoid the object. The method further includes determining, with the robotic controller of the autonomous work machine, whether the obstacle is in a category and in a location that requires the autonomous work machine to stop. Based the determination of whether the work machine is required to stop, motion of the work machine is selectively halted. A communication is generated to a supervisor indicating that motion has been halted and requesting user input. Based on the user input, the method includes selectively continuing the mission or shutting down the autonomous work machine.

Example 2 is the computer-implemented method of any or all of the previous examples wherein obtaining information relative to object detection include obtaining, from a camera mounted to the autonomous work machine, an image of the object.

Example 3 is the computer-implemented method of any or all of the previous examples wherein obtaining information relative to object detection include obtaining position information relative to the object.

Example 4 is the computer-implemented method of any or all of the previous examples wherein obtaining information relative to object detection include obtaining time information regarding when the object was detected.

Example 5 is the computer-implemented method of any or all of the previous examples wherein obtaining information relative to object detection include a categorization of the object generated by the robotic controller.

Example 6 is the computer-implemented method of any or all of the previous examples wherein the communication to the supervisor includes an image of the object.

Example 7 is the computer-implemented method of any or all of the previous examples and further comprising storing the information relative to object detection.

Example 8 is the computer-implemented method of any or all of the previous examples wherein determining with the robotic controller of the autonomous work machine, whether the obstacle is in a category and in a location that requires the autonomous work machine to stop generates a confidence metric and wherein halting motion of the work machine is performed when the robotic controller has determined that the work machine must stop and the confidence metric for such decision is above a selected threshold.

Example 9 is the computer-implemented method of any or all of the previous examples wherein determining with the robotic controller of the autonomous work machine, whether the obstacle is in a category and in a location that requires the autonomous work machine to stop generates a confidence metric and wherein halting motion of the work machine is not performed when the robotic controller has determined that the work machine must stop and the confidence metric for such decision is below a selected threshold.

Example 10 is the computer-implemented method of any or all of the previous examples wherein the robotic controller is configured to adjust at least one machine parameter for proceeding while the confidence metric is below the selected threshold.

Example 11 is the computer-implemented method of any or all of the previous examples wherein generating the communication to the supervisor includes selecting, with the robotic controller, a supervisor among a plurality of supervisors based on a categorization of the object by the robotic controller.

Example 12 is a computer-implemented of handling a machine health/job quality issue in an autonomous work machine is provided. The method includes detecting a machine health/job quality issue while performing a mission with the autonomous work machine and determining, with a robotic controller of the autonomous work machine, whether the detected machine health/job quality issue has an exception routine for the detected machine health/job quality issue. The method includes performing the exception routine for the detected machine health/job quality issue and determining whether the exception routine resolved the machine health/job quality issue. Based on whether the determination of whether exception routine resolved the machine health/job quality issue, the method includes selectively generating a communication to a supervisor, wherein the communication requests a supervisor decision. The method includes receiving user input indicative of a supervisor decision and taking responsive action.

Example 13 is the computer-implemented method of any or all of the previous examples wherein the responsive action is immediate shutdown of the autonomous work machine.

Example 14 is the computer-implemented method of any or all of the previous examples wherein the responsive action includes generating a path to a service location and moving the autonomous work machine to the service location.

Example 15 is the computer-implemented method of any or all of the previous examples and further comprising shutting down the autonomous work machine at the service location.

Example 16 is the computer-implemented method of any or all of the previous examples wherein the user input is indicative of a decision to ignore the machine health/job quality issue and the responsive action is continuing to perform the mission.

Example 17 is the computer-implemented method of any or all of the previous examples and further comprising determining with the robotic controller that the machine health/job quality issue cannot be ignored and generating a second communication to the supervisor indicating that the machine health/job quality issue cannot be ignored.

Example 18 is the computer-implemented method of any or all of the previous examples wherein generating the communication to the supervisor includes selecting, with the robotic controller, the supervisor among a plurality of supervisors based on a categorization of the machine health/job quality issue.

Example 19 is the computer-implemented method of any or all of the previous examples wherein generating the communication to the supervisor includes generating the communication to a supervisor at a remote operation center.

Example 20 is a control system for an autonomous work machine. The control system includes a robotic controller, a position detection system coupled to the robotic controller, and a sensor coupled to the robotic controller and configured to provide a sensor signal. A controlled system is coupled to the robotic controller to receive control signals from the robotic controller. The robotic controller is configured to generate an event relative to an object in an environment around the autonomous work machine or a machine health/job quality issue, document the event, and store the documented event. The robotic controller is further configured to selectively generate a communication containing at least some information relative to the documented event to a supervisor and to receive user input from the supervisor and take responsive action based on the user input.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of handling object detection in an autonomous work machine, the method comprising:
   detecting an object while performing an agricultural mission with the autonomous work machine, the autonomous work machine including a tractor and a towed implement, the towed implement having a width greater than a width of the tractor;
   determining, with a robotic controller of the autonomous work machine, whether the object requires the work machine to take action to avoid the object based on a detected position of the object, a current path of the work machine, and a width of the towed implement;

selectively obtaining information relative to object detection and storing the information, based on the determination of whether the object requires the autonomous work machine to take action to avoid the object;

determining, with the robotic controller of the autonomous work machine, whether the obstacle is in a category and in a location that requires the autonomous work machine to stop;

based the determination of whether the work machine is required to stop, selectively halting motion of the work machine;

generating a communication to a supervisor indicating that motion has been halted and requesting user input; and based on the user input selectively continuing the mission or shutting down the autonomous work machine.

2. The computer-implemented method of claim 1, wherein obtaining information relative to object detection include obtaining, from a camera mounted to the autonomous work machine, an image of the object.

3. The computer-implemented method of claim 1, wherein obtaining information relative to object detection include obtaining position information relative to the object.

4. The computer-implemented method of claim 1, wherein obtaining information relative to object detection include obtaining time information regarding when the object was detected.

5. The computer-implemented method of claim 1, wherein obtaining information relative to object detection include a categorization of the object generated by the robotic controller.

6. The computer-implemented method of claim 1, wherein the communication to the supervisor includes an image of the object.

7. The computer-implemented method of claim 1, and further comprising storing the information relative to object detection.

8. The computer-implemented method of claim 1, wherein determining with the robotic controller of the autonomous work machine, whether the obstacle is in a category and in a location that requires the autonomous work machine to stop generates a confidence metric and wherein halting motion of the work machine is performed when the robotic controller has determined that the work machine must stop and the confidence metric for such decision is above a selected threshold.

9. The computer-implemented method of claim 1, wherein determining with the robotic controller of the autonomous work machine, whether the obstacle is in a category and in a location that requires the autonomous work machine to stop generates a confidence metric and wherein halting motion of the work machine is not performed when the robotic controller has determined that the work machine must stop and the confidence metric for such decision is below a selected threshold.

10. The computer-implemented method of claim 9, wherein the robotic controller is configured to adjust at least one machine parameter for proceeding while the confidence metric is below the selected threshold.

11. The computer-implemented method of claim 1, wherein generating the communication to the supervisor includes selecting, with the robotic controller, a supervisor among a plurality of supervisors based on a categorization of the object by the robotic controller.

12. The computer-implemented method of claim 1, and further comprising monitoring a perimeter of the autonomous work machine while motion is halted.

13. The computer-implemented method of claim 1, wherein the agricultural mission is an agricultural mission relative to a crop.

14. The computer-implemented method of claim 13, wherein the agricultural mission includes applying nutrients to the crop.

15. The computer-implemented method of claim 13, wherein the agricultural mission includes harvesting the crop.

16. The computer-implemented method of claim 13, wherein the agricultural mission includes transporting logs.

* * * * *